US011620670B2

(12) United States Patent
Marangu et al.

(10) Patent No.: US 11,620,670 B2
(45) Date of Patent: *Apr. 4, 2023

(54) FUEL LOYALTY REWARDS

(71) Applicant: VISA INTERNATIONAL SERVICE ASSOCIATION, San Francisco, CA (US)

(72) Inventors: Wesley Kimathi Marangu, Foster City, CA (US); Ritu Panchal, Foster City, CA (US); Edmar Soriano, Foster City, CA (US); Peter Rhee, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/731,541

(22) Filed: Apr. 28, 2022

(65) Prior Publication Data
US 2022/0253886 A1    Aug. 11, 2022

Related U.S. Application Data

(63) Continuation of application No. 17/269,899, filed as application No. PCT/US2018/048358 on Aug. 28, 2018, now Pat. No. 11,481,796.

(51) Int. Cl.
*G06Q 30/02* (2012.01)
*G06Q 30/0226* (2023.01)
(Continued)

(52) U.S. Cl.
CPC .......... *G06Q 30/0226* (2013.01); *B60S 5/02* (2013.01); *G06Q 20/4014* (2013.01); *G06Q 30/0236* (2013.01)

(58) Field of Classification Search
CPC .......... G06Q 30/0226; G06Q 20/4014; G06Q 30/0236; B60S 5/02
See application file for complete search history.

(56) References Cited

U.S. PATENT DOCUMENTS 5,819,226 A * 10/1998 Gopinathan ......... G06Q 40/025
705/44
6,330,546 B1 * 12/2001 Gopinathan ........... G06Q 40/00
705/38
(Continued)

FOREIGN PATENT DOCUMENTS

WO     2011106375        9/2011

OTHER PUBLICATIONS

Invisible Engines, Evans, MIT Press, 2006, pp vii-80.*
(Continued)

*Primary Examiner* — Michael I Ezewoko
(74) *Attorney, Agent, or Firm* — Loeb & Loeb LLP

(57) ABSTRACT

A processing system for fuel transactions analyzes transactions for symbols indicating a purchase amount and directs information about the purchase to a loyalty platform. The loyalty platform may identify and communicate in real time or near real time with a personal device associated with the purchaser of the fuel. A user interface of the personal device may allow the purchaser to review and select options for processing the fuel purchase using value from a loyalty program account. The selected option may be used to modify fuel purchase parameters prior to settlement of the transaction or simply add points to the user loyalty program account.

20 Claims, 5 Drawing Sheets

(51) Int. Cl.
  *B60S 5/02* (2006.01)
  *G06Q 20/40* (2012.01)
  *G06Q 30/0207* (2023.01)

(56) References Cited

U.S. PATENT DOCUMENTS

| | | | | |
|---|---|---|---|---|
| 8,065,233 | B2* | 11/2011 | Lee | G06Q 40/025 |
| | | | | 705/76 |
| 9,185,095 | B1* | 11/2015 | Moritz | H04L 63/0861 |
| 10,509,997 | B1* | 12/2019 | Gupta | G06Q 10/00 |
| 10,628,826 | B2* | 4/2020 | Yu | G06Q 10/0635 |
| 10,902,430 | B2* | 1/2021 | Ding | G06Q 20/4016 |
| 10,997,596 | B1* | 5/2021 | Thomas | G06Q 20/4016 |
| 11,093,845 | B2* | 8/2021 | Zoldi | G06N 5/025 |
| 11,288,571 | B1* | 3/2022 | Gupta | G06N 3/08 |
| 11,429,974 | B2* | 8/2022 | Liu | H04L 63/1466 |
| 2001/0050314 | A1 | 12/2001 | Lee | |
| 2010/0318463 | A1 | 12/2010 | Reany | |
| 2014/0324699 | A1* | 10/2014 | Ding | G06Q 20/4016 |
| | | | | 705/44 |
| 2015/0106196 | A1* | 4/2015 | Williams | G06Q 20/326 |
| | | | | 705/14.51 |

OTHER PUBLICATIONS

International Search Report and Written Opinion of International Application No. PCT/US2018/048358, dated Dec. 4, 2018, 10 pages.
Office Action (Non-Final Rejection) dated Dec. 9, 2021 for U.S. Appl. No. 17/269,899 (pp. 1-37).
Office Action (Notice of Allowance and Fees Due (PTOL-85)) dated Mar. 24, 2022 for U.S. Appl. No. 17/269,899 (pp. 1-17).

* cited by examiner

FUEL LOYALTY REWARDS

CROSS-REFERENCE TO RELATED APPLICATIONS

This application is a continuation application of U.S. application Ser. No. 17/269,899, filed on Feb. 19, 2021 and entitled "Fuel Loyalty Rewards", which is a national stage application under 35 U.S.C. 371 of International Patent Application No. PCT/US18/48358, filed on Aug. 28, 2018 and entitled "Fuel Loyalty Rewards", the entire contents of which are hereby incorporated by reference.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In a typical transaction process, a single transaction authorization process is followed. That is, items are captured at a point of sale or by an online purchase session, the full amount of the transaction is calculated, that purchase amount is authorized through the payment network, and the transaction is approved if conditions are met. In this scenario, a loyalty rewards program may monitor transactions and make real time or near real time offers related to the current and/or future transactions while the purchaser is still engaged in the checkout process.

However, pay-at-the-pump fuel purchases follow a different flow as the amount of the eventual transaction is not yet known. At the time a payment instrument is captured at the pump, before the pump is authorized, a "test" transaction is entered to determine that the payment instrument is valid. In some cases this amount is small, such as $0.50 while in other cases, the test transaction may approximate the amount of a purchase, such as $50.00. After fueling is completed, a second transaction is entered representing the actual amount of the transaction. Later, at the time of settlement, the test transaction is reversed and the actual amount is charged against the payment instrument. In these transactions, it is not possible to make real time or near real time offers because the actual value of the transaction is not known by the rewards system.

Further, in the typical transaction, a user interface is available for making the loyalty offer, either via the point of sale device in a retail setting or via a user's screen when engaged in an online transaction. However, a pay-at-the-pump transaction lacks a sufficient user interface to support real time interaction with the purchaser to complete an offer selection.

SUMMARY

A system and method receives a plurality of transactions associated with a single purchase and in real time determines the actual purchase amount. After the purchase amount is determined, the correct details of the transaction are forwarded to an awards processor that determines if the transaction qualifies for an award. If so, the awards processor sends information related to an award or choices associated with redeeming an award to a personal device of the user. The user is then in real time either notified of the award value or given a choice for applying award points to the purchase usually before leaving the vicinity but always prior to final settlement of the transaction. This system and method require no changes on the part of the fuel provider and works with any automated fuel dispenser and forecourt controller.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

A pay-at-the pump fuel pump is unlike any other point of sale device in current use because a fuel purchase is not processed like other transactions, as discussed previously. More specifically, the final amount of the transaction is not known when the fuel purchase begins so a test transaction is communicated to a payment system. Once the final amount of the transaction is known, a second transaction is sent and during settlement, the test transaction is reversed and the final amount of the transaction is processed by the payment system. Those systems that support rewards interactions require the user to swipe a rewards card or hand enter reward account details prior to beginning the purchase transaction. However, some pumps do not offer this extra step, while pumps that do often have users who do not bother to enter reward account details prior to a purchase.

A system and method in accordance with the current disclosure screens and groups transactions from the same fuel pump having the same payment card and proximate times. The multiple transactions are analyzed for symbols indicative of the final transaction and this final transaction is selected. Information from the selected transaction is forwarded to a rewards system. The rewards system determines if the user associated with the payment card has a rewards account and, if so, determines what reward type choices may be available to the user. The user may then be contacted by the rewards system in near real-time via a personal device so that the user may be aware of the qualification of the transaction for a reward and possible application of award value to reduce the purchase amount.

Figure 1:
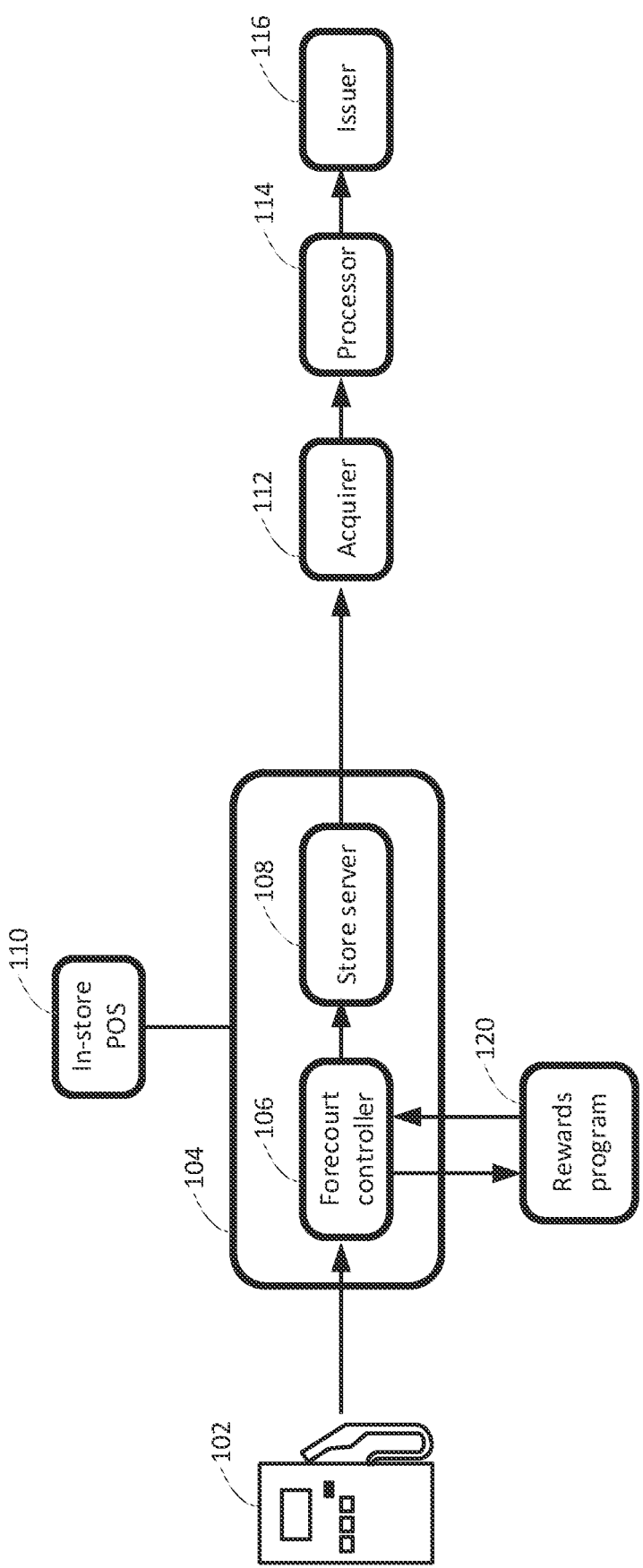
FIG. 1 is a system diagram illustrating a prior art fuel purchase system with a brand-specific loyalty offering.

FIG. 1 illustrates a prior art system for processing transactions at a fuel pump. The prior art system includes a pump 102, a station system 104 including a forecourt controller 106 and a server 108. The station system 104 may be connected to an in-store point of sale (POS) device 110. In some other embodiments, the POS 110 may be part of or hosted by the station system 104. In a conventional manner, the store server 108 may connect to an acquirer 112, which in turn my be connected to a processor 114 and, ultimately, a card issuer 116.

In operation, a customer may approach the pump 102 and be prompted to swipe a loyalty card or enter loyalty program data. A technical problem is that the pump does not have sufficient computing power and user interface capacity to interact in real time with downstream entities. The forecourt controller 106 and store server 108 do not have a user interface, or at least one accessible to a customer. Further, since multiple transactions are associated with each purchase, processing of transaction-related rewards could not be completed until after settlement, when non-purchase transactions were zeroed out. A prior art solution to this problem was to require purchasers to enter their reward information ahead of time and set up a second connection between the forecourt controller and a rewards program server 120. The rewards program server 120 supports only one loyalty program, typically, a store-brand loyalty program.

After entering loyalty program data, the forecourt controller may reduce the cost per gallon of the transaction at the pump so that the price is reduced before pumping fuel. The price reduction may address the problem of the minimal user interface at the pump and the inability to decipher actual purchase amounts prior to settlement since the store has the ability to adjust the purchase price before pumping begins. There are at least two problems with this technique. First, the purchaser must remember to enter the loyalty program information at a gas pump, assuming it is at hand which is cumbersome, at best. Second, the purchaser is restricted to the rewards program offered by the store. Related, as the loyalty information is entered before the transaction is complete, the loyalty system cannot determine if a loyalty offer is appropriate until the final transaction is complete.

After the purchase price adjustment, fueling may commence and the transaction may be processed following hanging up the hose at the pump to end the purchase. Transactions, both card test transactions and the actual purchase transaction may be sent to the acquirer 112, acting on behalf of the store, a processor 114, and finally to the issuer 116. The confirmation of the test transaction from the processor 114/issuer 116 may serve as the approval for the transaction to take place and the forecourt controller 106 may authorize the pump 102 to begin the fueling operation. Even in an environment not constrained by computing power or user interface, the sheer number of fuel pumps in use, the variety of manufacturers of fuel dispensers and forecourt controllers represents a significant technical challenge in terms of scale and integration.

Figure 2:
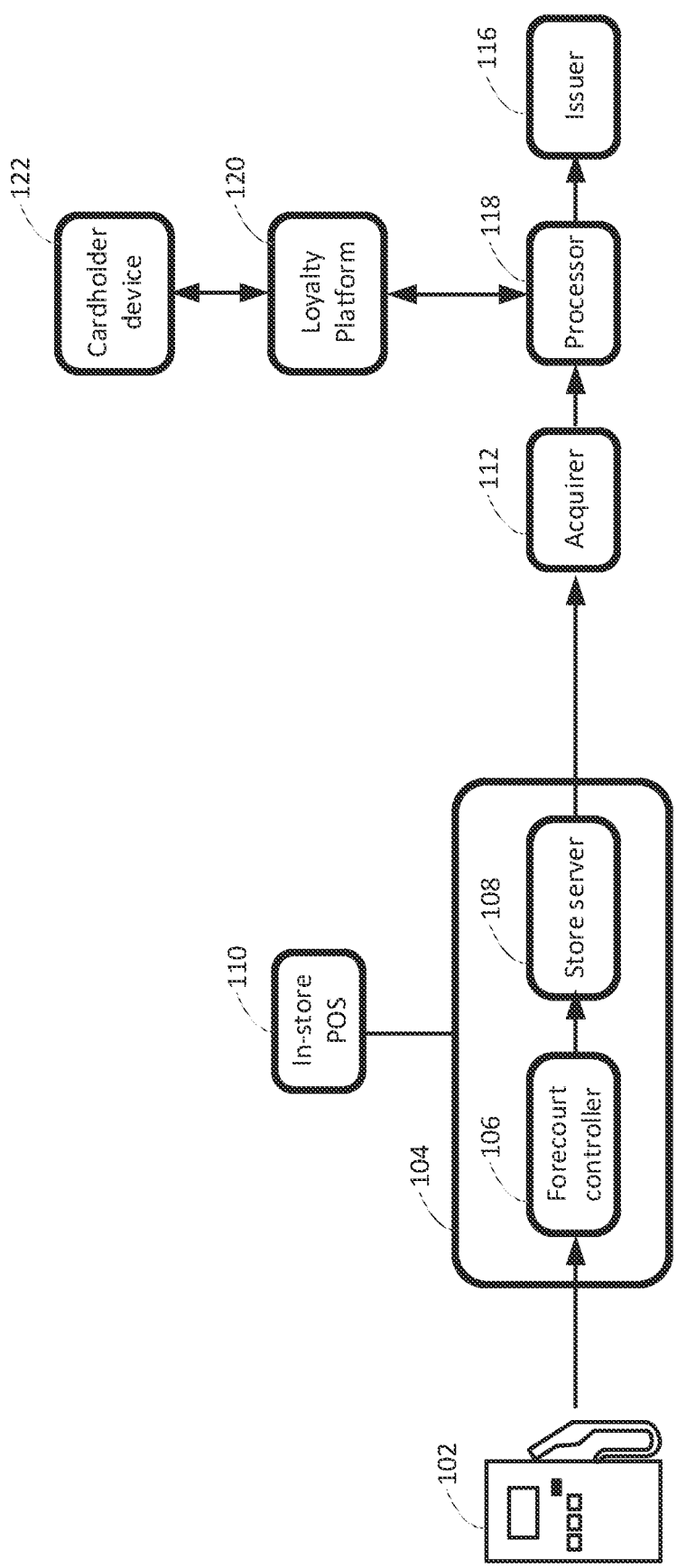
FIG. 2 is a system diagram showing a fuel purchase system in accordance with the current disclosure.

FIG. 2 is a block diagram of system in accordance with the current disclosure for processing fuel pump transactions. It should be noted that while the specification mentions fuel, the system could be applicable to many situations where the final amount is not known when the transaction begins or the payment device is initially entered. While the word "fuel" may connote a liquid like gasoline or diesel, fuel just as easily could be electricity such as the electricity used to charge an electric car. Similarly, "fuel" may also be thought of as time such as when paying for a parking spot but the user is not sure how long the spot will be used or when paying for a service and the final amount for the service is not initially known. For example, in some situations a merchant may enter a test transaction before proceeding to provide a service such as a car repair where the final amount may not be initially known but the service provider may appreciate some indication that the user will be financially able to pay for the service.

Referring again to FIG. 2, in this embodiment, the need to enter two sets of data into the pump is eliminated by an enhanced processing and communication system. Similar to the embodiment of FIG. 2, the system illustrated has a pump 102, and a station system 104 that may include a forecourt controller 106 and a store server 108. As above, the in-store POS 110 may be part of the station system 104 or may be coupled to the station system 104. In the described embodiments, interactions with the automated fuel dispenser (AFD) and forecourt controller are unchanged over the prior art rewards systems. The ability to select the correct transaction amount from among the multiple transactions associated with a sale and the interactions with the user related to rewards and/or discounts are performed without interaction on the part of the fuel provider.

The acquirer 112 receives transaction requests and forwards them to an enhanced processing system 118, which is described in more detail below. The processor 118 may be coupled to one or more issuers 116 in a conventional way, but may also be coupled to a loyalty platform 120. The loyalty platform 120 may receive transactions being processed by any number of retail and commercial operations but may also receive fuel transactions from the pump 102, as well as many other fuel pumps which are omitted for clarity. The loyalty platform 120 may service fuel transactions for multiple brands and multiple loyalty systems including, but not limited to, fuel suppliers, airlines, retailers, and branded credit cards. The loyalty platform 120 may identify a user associated with a payment card used in a transaction to determine the loyalty program with which to associate the transaction. Further, and unlike the prior art system, the loyalty platform 120 may employ the user identification to contact a communication device 122 registered to the cardholder.

This communication in real time or near real time allows the user to interact with the loyalty platform to both see that the transaction was associated with the user's loyalty account as well as to send instructions for choices associated with the purchase, when available. For example, the user may apply points to reduce the total cost of the purchase or may simply select to have any new points from the current transaction added to the user's reward account.

Figure 3:
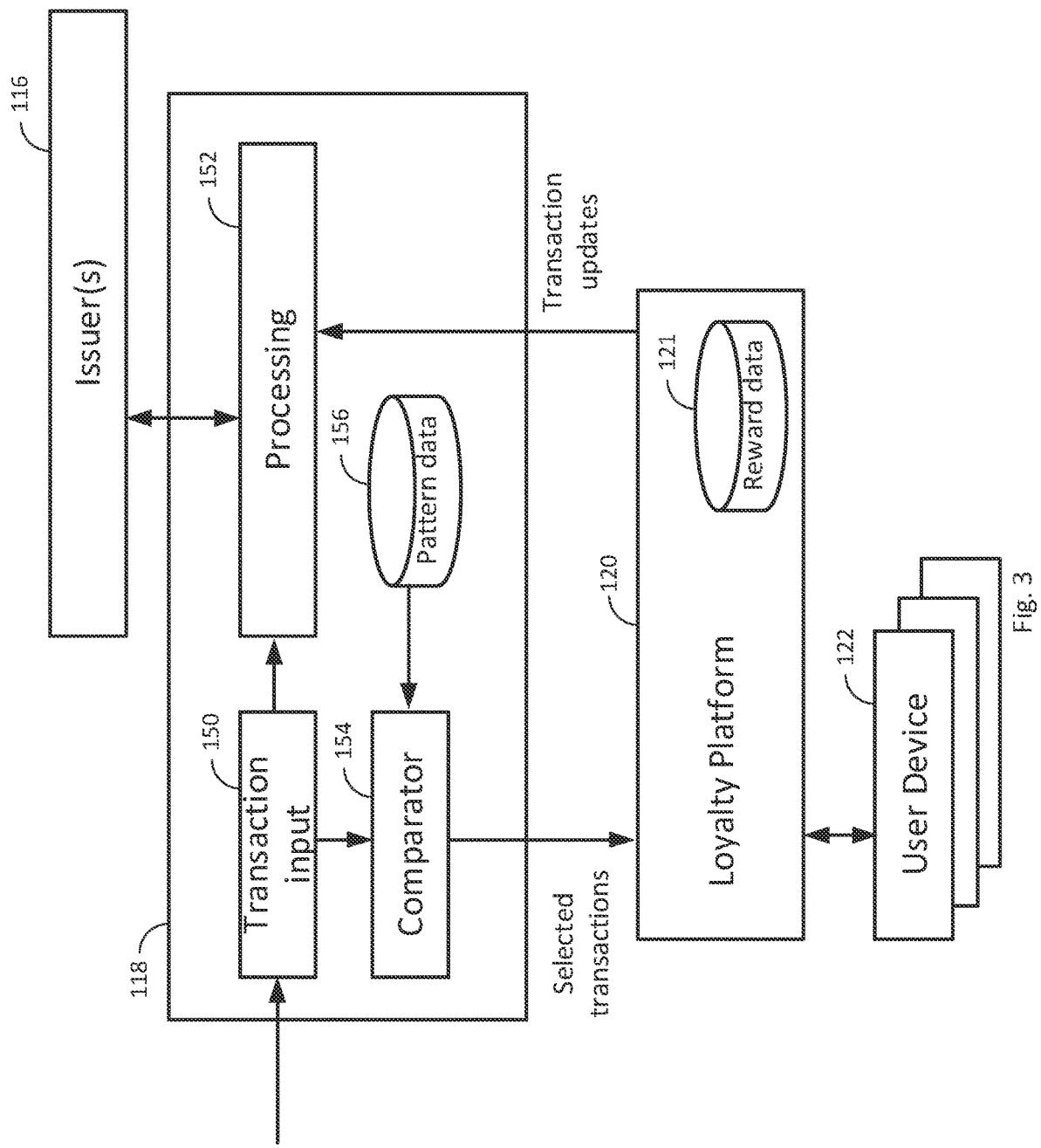
FIG. 3 is a block diagram of a modified transaction processing system in accordance with the current disclosure.

FIG. 3 is a simplified and representative block diagram of an embodiment of the processor 118. The processor 118 may include an input 150 that may receive transactions, performs error checks, etc. and buffer transactions into both a processing function 152 and a comparator 154. The processing function 152 may perform conventional tasks such as managing authorizations, returns, etc. The comparator 154 may examine transactions for symbols indicative of transaction types. These may include any transactions that qualify for awards. However, in the case of fuel transactions, as described above, there may be multiple transactions with different amounts for a single purchase. The comparator 154 may use pattern data from a database 156 to filter out only those transactions with symbols matching a final purchase amount. These selected transactions may be passed to the loyalty platform 120. As discussed above, the loyalty platform 120 may use payment card information to identify a cardholder associated with the payment card and then send a message related to the transaction to a user device 122 known through a registration process.

In some embodiments, artificial intelligence may be used to learn from the pattern database 156 on how to determine whether a transaction is test transaction or a final transaction. By studying a vast amount of transactions, artificial intelligence may improve the ability to determine the difference between a test transaction and a final transaction which may assist in determining the timing and type of offer to be made.

Figure 4:
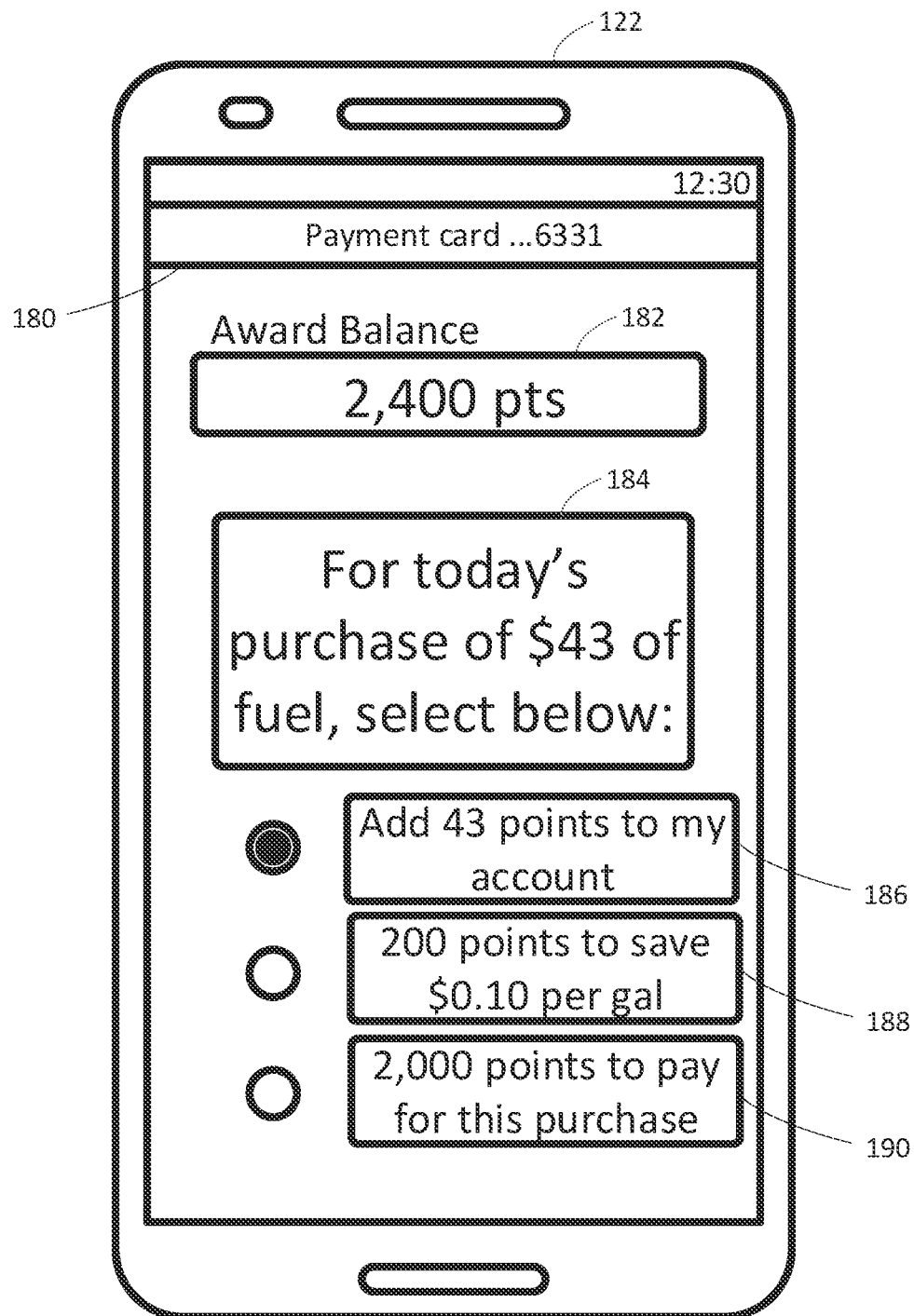
FIG. 4 is an exemplary user interface of a user device interacting in the system of FIG. 2.

Turning briefly to FIG. 4, an exemplary user interface may permit the user to select from options related to the loyalty program on a user device 122. The user interface may include fields identifying the payment card 180, a field indicating a current balance 182, and a field identifying an action 184. Radio buttons may allow selection among the three options presented in this illustration, a field for adding points to the user account 186, a field for applying a discount 188, and a field for paying for the purchase using points 190. Other fields may be present in actual embodiments, such as indications of the brand of the fuel station, navigation to other screens, etc. The activation of a radio button may cause the selected option to activate executable code in the user device 122 that causes a signal to be sent to the loyalty platform 120. The loyalty platform 120 may then use the information to adjust its database (not depicted) to cause a change to the user's reward account according to the selection.

Returning to FIG. 3, after the loyalty platform 120 has made its internal adjustments to the user's reward account, for example, in a reward account database 121, the loyalty platform 120 may, when needed, generate a message to the processor 118 that enters transaction for altering the original transaction prior to settlement or that causes an adjustment so that the settled amount is correct per the user's selection of terms. For example, if the user selects to only have the award points for the transaction added to the account, no adjustment transaction needs to be sent to the processor 118.

Figure 5:
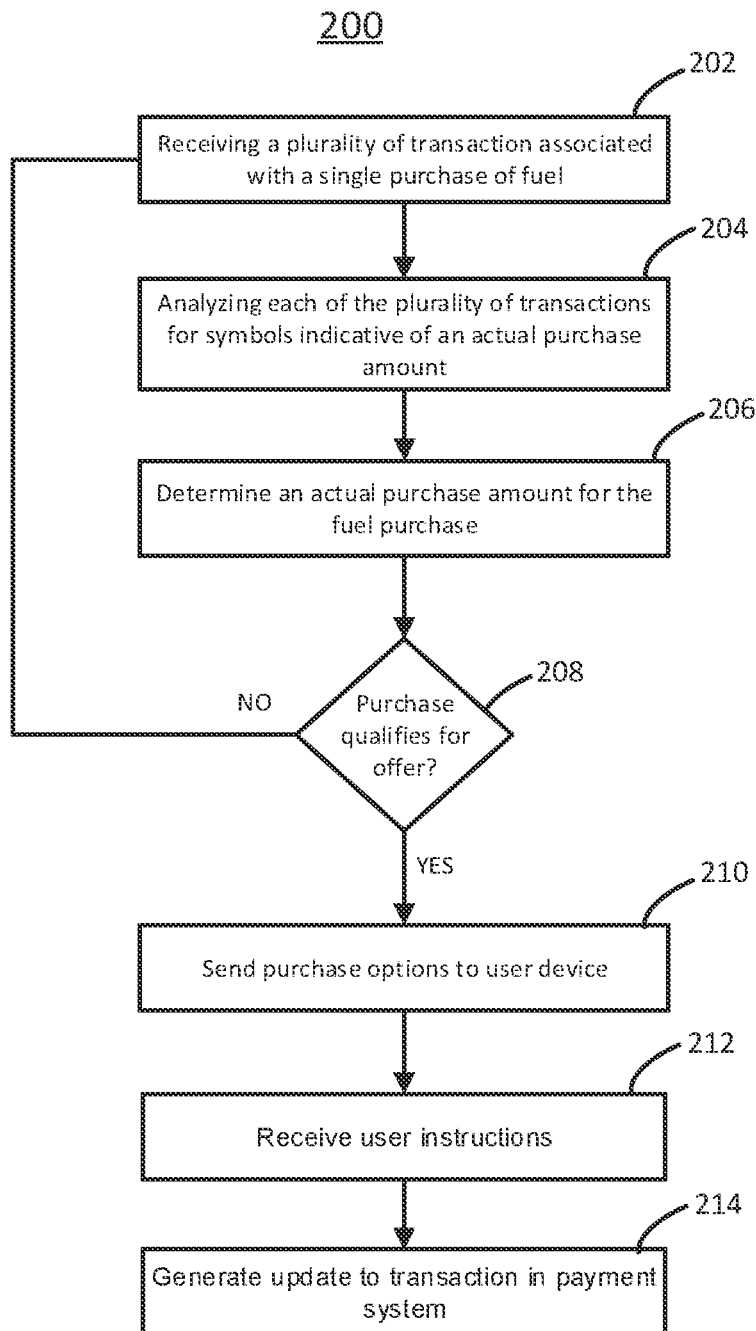
FIG. 5 is a flowchart of a method of generating an offer in a fuel dispensing environment.

FIG. 5 is a flowchart of a method 200 of generating an offer in a fuel dispensing environment. At block 202, a plurality of transactions associated with a single purchase of fuel may be received at a transaction processing system, or more simply, a processor 118. Each transaction received may be analyzed for symbols indicative of a transaction containing the actual purchase amount at box 204. As noted previously, artificial intelligence may be used to assist in determining whether a transaction is a test transaction or a final transaction.

In another aspect of the system, the payment system may also be in communication with a surveillance system at the fuel location. The surveillance system may be a camera and the camera may be used to determine when fueling is complete or a service is finished. For example, when the surveillance system indicates a fuel nozzle has been replaced, the system may assume the transaction is complete and the amount which will follow shortly thereafter is a final amount. The surveillance system may be analyzed by an algorithm and the determination that a transaction is complete may be determined by the algorithm. In other embodiments, the surveillance system may be used as part of the artificial learning system to determine when a transaction is complete.

In yet another aspect, the surveillance system may obtain license plate data. The license plate data may be used to verify a user and access preferences for the user or for a particular vehicle. For example, a vehicle that uses lots of gas may benefit more from a fuel discount while another vehicle that is more fuel efficient may benefit more from an airline mileage reward. The license plate data may be used to assist in recommending a reward or ranking the rewards.

After determining which transaction represents the purchase amount, the transaction may be further processed to extract the purchase amount at block 206 as well as payment instrument information such as a personal account number (PAN) of a credit or debit card. This information may be tied back to the purchaser of the fuel. The transaction details and user identification may be forwarded to a loyalty platform 120. There, the transaction may be reviewed, at block 208, to determine if the transaction qualifies for an award or for redemption of an award. For example, a total for the current purchase may exceed a qualification threshold. In another embodiment, the total count of past purchases and the current purchase may qualify for an award or redemption. In an embodiment, the count must not be advanced for non-purchase amount transactions. That is, a prequalification transaction If not, execution follows the 'no' branch back to block 202. If so, execution may continue to block 210 and a notification may be sent to a user device 122. The user may have registered a personal device 122 when registering for a loyalty program, also referred to as a reward program.

The notification may simply include a message to the user acknowledging that the fuel purchase has been logged and any points associated with the purchase amount are being added to the user reward account or that an automatic discount per gallon has been applied. The message may also include selections for the user to make related to application of reward points to the transaction, is such selections are available. For example, as shown in FIG. 4, the user may be able to reduce the out-of-pocket expense associated with the purchase by applying award points. These selections may be returned to the loyalty platform at block 212.

In some embodiments, the various options may be communicated through computer generated verbal commands. For example, the options may be communicated to a smart phone of the user via a voice message which is read to the user. In another embodiment, many fuel pumps have speakers and intercoms which may be adapted to communicate information and receive information. In addition, the responses of the user may be received through voice recognition, either through the fuel pump or through a mobile computing device. As a result, a user may not have to maneuver through menus at a fuel pump but may be able to hear and communicate selections by only using a voice. Logically, in some systems, the voice may be verified by comparing the voice of the user to previous voice recordings of the user.

In some embodiments, artificial intelligence may be used to determine the order of the offer options available to a user. In some situations, a purchase may qualify for a plurality of offers. The user may have the ability to select one of the plurality of offers. For example, a user may be able to use airline miles to pay for a transaction or may be able to have a given discount on the transaction but may be not both. Further, the transaction may be used to generate hotel points, airline miles, vendor points or discounts. With so many options, displaying all the options may take up more than a single page of a user interface. By analyzing past patterns of the specific users, similar users or a bulk number of users, the offers may be displayed in an order that has been determined by the artificial intelligence systems to be most likely. For example, a user may not like to fly meaning that airline miles may not be relevant to that user.

In another aspect, users may be able to use a user interface to set preferences regarding reward preferences. For example, a heavy fuel user may appreciate fuel discounts while a user that likes to travel may appreciate airline miles. The user interface (not shown) may access the loyalty platform 120, may display the loyalty options available for the user and the user may be able to prioritize them. The prioritization may be fuel merchant specific.

In another aspect, the usage data of offers specific to the fuel type purchase may be provided to the offer providers. The offer providers may have a user interface (not shown) which may display the usage of its offers in comparison to other offers. Further, the usage data may be broken down according to user characteristic (if known) such that the offer providers may see what user characteristics are correlated to successful offers. In addition, the offer providers may be able to adjust its offers in an attempt to improve or reduces usage of the offers. The offer provider interface may allow for faster response to offer usage rates.

At block 214, the loyalty platform may generate transaction adjustments related to the user selection so that the user can select and apply rewards in near real time, as opposed to waiting until after settlement of the fuel purchase in a prior art scenario. Because the user may be contacted while still at the station or within a few minutes of making the purchase, the user both makes the selection, if applicable, and associates the benefit of the reward program while the purchase is still fresh in the user's mind.

A technical problem addressed by the system is the limited user interface and processing power in a fuel pump compared to a typical point of sale or even an online purchase event. The ability to process multiple fuel transactions per single purchase requires an improved processing system that can accumulate and sort transactions to select the transaction that represents the actual purchase. The moving of processing from the point of purchase, in this case, the limited function fuel pump to a backend system overcomes the lack of capability of the pump. This improvement occurs without requiring changes to millions of expensive and highly regulated fuel pumps in the United States and beyond.

The system described benefits both users and loyalty program operators. Users are able to receive and apply reward program benefits without being limited to brand-specific reward programs and extra steps at the pump. Loyalty program operators are given access to transactions at fuel pumps in near real time, even for purchases made at brands not associated with reward program.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method of generating an offer in a fuel dispensing environment, the method comprising:
   receiving, via a processor over a payment network, a plurality of transactions associated with a single purchase of fuel made by a purchaser at a fuel pump;
   analyzing, via the processor, characteristics of each of the plurality of transactions, wherein analyzing characteristics of each of the plurality of transactions is performed without interaction with a provider of the fuel and comprises: applying artificial intelligence to determine whether each of the plurality of transactions is a test transaction or an actual transaction that has one or more symbols indicative of an actual purchase amount;
   determining, via the processor, an actual purchase amount from a one of the plurality of transactions having one or more symbols indicative of the actual purchase amount;
   determining, via a loyalty platform in communication with the processor, that the actual purchase amount qualifies for a plurality of real time offers linked to a loyalty program associated with the purchaser, wherein at least one of the plurality of real time offers is from an entity that is different from the provider of the fuel;
   determining, via the loyalty platform, an ordered list of the plurality of real time offers using artificial intelligence by analyzing past reward preference patterns of the purchaser such that offers that the purchaser is more likely to select are listed before offers that the purchaser is not likely to select;
   sending the ordered list of the plurality of real time offers to a personal device associated with the purchaser for display on a user interface of the personal device; and
   receiving from the user interface of the personal device associated with the purchaser, a selection of one of the plurality of real time offers from the ordered list prior to settlement of the plurality of transactions associated with the single purchase of fuel at the fuel pump.

2. The method of claim 1, further comprising receiving, via the fuel pump, payment instrument credentials.

3. The method of claim 2, wherein receiving the payment instrument credentials comprises receiving a personal account number of the purchaser and a code associated with authorizing the transaction.

4. The method of claim 1, wherein one of the plurality of real time offers is a discount on the purchase of the fuel based on redemption of points accrued in the loyalty program.

5. The method of claim 1, wherein one of the plurality of real time offers is application of new points based on the purchase amount to the loyalty program account of the purchaser.

6. The method of claim 1, wherein one of the plurality of real time offers is application of new points based on a count of qualifying purchases.

7. A system for processing rewards in a fuel dispensing environment comprising:
   a fuel pump;
   a forecourt controller coupled to the fuel pump, the forecourt controller generating a plurality of transactions for a single fuel purchase;
   a processor that receives transactions from the forecourt controller over a payment network, the processor including a comparator that applies artificial intelligence to determine whether each of the plurality of transactions for the single fuel purchase is an actual transaction or a test transaction, and selects one transaction of the plurality of transactions for the single fuel purchase that is an actual transaction without interaction from a provider of the fuel, the one transaction having data representing an actual fuel purchase amount and a payment instrument number associated with a user;
   a loyalty platform coupled to the processor, the loyalty platform including a processing device and physical memory for generating reward program options related to the fuel purchase, the physical memory storing processor executable instructions to:

determine that the actual purchase amount qualifies for a plurality of real time offers linked to a loyalty program associated with the purchaser, wherein at least one of the plurality of real time offers is from an entity that is different from the provider of the fuel;

determine an ordered list of the plurality of real time offers using artificial intelligence by analyzing past reward preference patterns of the user such that offers that the user is more likely to select are listed before offers that the user is not likely to select;

send the ordered list of the plurality of real time offers to a personal device associated with the user for display on a user interface of the personal device; and an application program executing on the personal device of the user, the application program presenting a user interface that displays the plurality of real time offers as the reward program options received from the loyalty platform on the personal device and returns a user instruction for managing the transaction at the loyalty platform via the user's selection of one of the plurality of real time offers from the ordered list.

8. The system of claim 7, wherein the loyalty platform is programmed to generate an instruction to the processor that generates a new transaction related to an adjustment applied to the originally received fuel purchase transaction.

9. The system of claim 7, wherein the loyalty platform includes a database that stores user value associated with the user reward program account.

10. The system of claim 7, wherein the comparator of the processor uses a pattern database to select the one transaction of the plurality of transactions by matching a stored pattern to a pattern received in the actual fuel purchase amount.

11. The system of claim 7, wherein the comparator examines transactions for a symbols indicative of the actual fuel purchase amount.

12. A computer-method of generating an offer, the method comprising:

receiving, at a processor of a payment system, a plurality of transactions associated with a single purchase of a purchaser;

analyzing, at the processor, each of the plurality of transactions to determine at least an actual transaction and a test transaction from the plurality of transactions, wherein analyzing each of the plurality of transactions comprises: applying artificial intelligence to determine whether each of the plurality of transactions is an actual transaction or a test transaction;

extracting, at the processor, transaction details associated with the actual transaction, the transaction details including an actual purchase amount and payment instrument information;

forwarding the transaction details associated with the actual transaction from the processor to a loyalty platform;

identifying, at the loyalty platform, a reward account of the purchaser based on the payment instrument information, the reward account being associated with a reward program;

determining, at the loyalty platform, that the actual transaction qualifies for one or more offers associated with the reward program, wherein at least two offers in the plurality of real time offers are from two different entities;

determining, at the loyalty platform, an ordered list of the plurality of real time offers using artificial intelligence by analyzing past reward preference patterns of the purchaser such that offers that the purchaser is more likely to select are listed before offers that the purchaser is not likely to select;

sending the ordered list of the plurality of real time offers to a personal device associated with the purchaser for display on a user interface of the personal device;

receiving, at the loyalty platform from the user interface of the personal device, a selection of one of the plurality of real time offers from the ordered list; and communicating a message from the loyalty platform to the processor according to the selection to execute the selection in real time prior to settlement of the actual transaction.

13. The computer-implemented method of claim 12, wherein analyzing each of the plurality of transactions to identify at least an actual transaction and a test transaction includes examining each of the plurality of transactions for one or more symbols indicative of an actual transaction.

14. The computer-implemented method of claim 12, wherein the plurality of real time offers provided at the user device include an offer to apply points to the reward account of the purchaser and an offer to apply points to reduce the actual purchase amount associated with the single purchase.

15. The computer-implemented method of claim 12, wherein the single purchase is associated with a purchase of fuel at a fuel pump.

16. The computer-implemented method of claim 15, wherein analyzing each of the plurality of transactions to identify at least an actual transaction and a test transaction includes applying a surveillance system at the fuel pump to determine when fueling is complete and correlating the completion of fueling with the actual transaction.

17. The computer-implemented method of claim 12, wherein the plurality of real time offers are provided as a voice message at the user device.

18. The computer implemented method of claim 12, further comprising receiving the message at the processor from the loyalty platform, and generating an update to the actual transaction in real time based on the selection.

19. The method of claim 1, wherein each of the plurality of transactions having an identifier associated with the purchaser, the method further comprising:

associating, at the loyalty platform, the purchaser with the loyalty program using the identifier associated with the purchaser.

20. The method of claim 1, the method further comprising:

generating, via the loyalty platform, a user interface formatting for the ordered list of the plurality of real time offers;

sending the user interface formatting for the ordered list of the plurality of real time offers to the personal device associated with the purchaser.

* * * * *